Jan. 7, 1936.  F. HOLTON  2,027,340

TROMBONE

Filed March 22, 1934

INVENTOR
Frank Holton
BY Wheeler, Wheeler and Wheeler
ATTORNEYS

Patented Jan. 7, 1936

2,027,340

UNITED STATES PATENT OFFICE 2,027,340

TROMBONE

Frank Holton, Elkhorn, Wis., assignor to Frank Holton & Co., Elkhorn, Wis., a corporation of Illinois Application March 22, 1934, Serial No. 716,809

3 Claims. (Cl. 84—395)

My invention relates to an improvement in trombones.

The object of my invention is to provide improvements in the inside and outside tubes of a slide trombone whereby to improve the action primarily through improvement in the lubrication and reduction of wear of the sliding parts.

More particularly stated, it is the object of my invention to provide an improved type of stocking upon the inside tube of a slide trombone and to provide a wear piece for the outer margin or lip of the outside tube, whereby to maintain an accurate alignment of the inside tube with the outside tube, and to provide proper lubrication of the sliding parts.

In the drawing.

Like parts are designated by the same reference characters throughout the several views.

Figure 1:
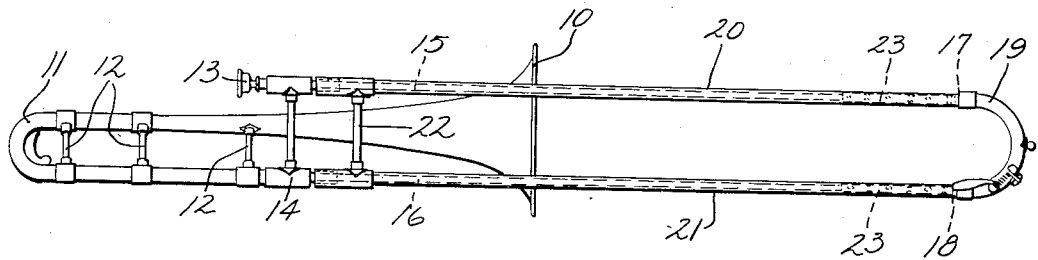
Fig. 1 is a side elevation of a complete trombone showing the improved parts thereof in dotted lines.
Figure 2:
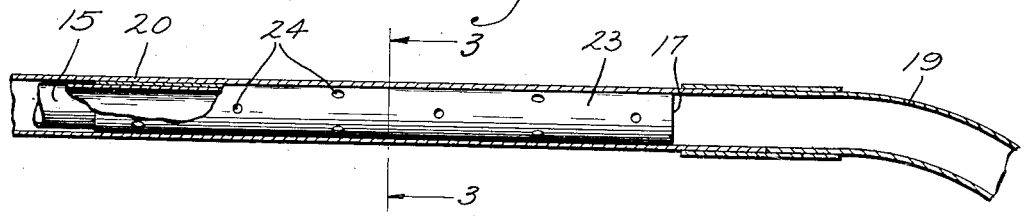
Fig. 2 is a vertical section through a portion of the structure shown in Fig. 1 and exhibiting in side elevation my improved stocking for the inside tube.
Figure 3:
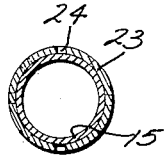
Fig. 3 is a section on line 3—3 of Fig. 2 but showing only the inside tube and its stocking.

As shown in Fig. 1, my improved construction is incorporated in a somewhat conventional type of slide trombone which includes fixed parts including a bell 10, a stationary curved portion 11 with cross braces at 12 and a mouth piece 13. Extending from the mouth piece and from a portion 14 of the stationary parts of the trombone are two inside tubes 15 and 16, which project beyond the bell a considerable distance and terminate at 17 and 18.

A U-shaped slide 19 is provided with two outside tubes 20 and 21 connected at 22 by a crossbar. These tubes, both inside and outside, are usually formed of brass or metal of somewhat similar characteristics, and they are made as thin and as light in weight as is practicable to withstand the mechanical stresses to which they may be subjected. They are, however, by reason of their length and the thinness of the stock of which they are made, quite resilient.

The inside tubes 15 and 16 are of an appreciably smaller external diameter than the internal diameter of the outside tubes, and since it is necessary to preserve air-tight relationship at 17 and 18 between the outside tubes and the inside tubes, I provide stockings 23 upon the inside tubes which comprise sleeves of suitable material tightly secured upon the exterior of the ends of the inside tubes. These stockings are of sufficient thickness to form a substantially air-tight fit in conjunction with the inner surfaces of the outside tubes when proper lubrication is provided between the contacting surfaces.

It is therefore important that provision be made for maintaining a proper quantity of lubricant between the stockings and inside surfaces of the outside tubes, and I therefore provide pockets 24 in the exterior surfaces of the stockings whereby to provide a lodging place for excess lubricant which, even though fed in reasonably large quantities into the open ends of the outside tubes, may in the repeated reciprocation of the stockings in the outside tubes, be picked up by the stockings and retained in these pockets 24 so as to be readily available for supply, when needed, in the continued playing of the instrument.

I have found from experimentation that the provision of these pockets is extremely well adapted to the solution of the problem of providing proper and adequate lubrication between the stockings and the inside surfaces of the outside tubes, and this is especially true by reason of the adoption of a type of lubricant which is semi-solid and which may be lodged in the pockets 24 so as to be available for lubrication when the moist atmosphere in the tubes develops during the playing of the instrument and may cause a development of an emulsion or liquefaction of the semi-solid lubricant in the pockets.

In trombones as heretofore constructed with a comparatively small inside tube there has, of course, been a certain amount of lost motion or "play" between the inside and outside tubes, particularly adjacent the mouths of the outside tubes and, by reason of the size of the stockings with relation to the inside tubes, there has been a theoretical line contact at the extreme lips of the mouths of the outside tubes which has induced wear at this point to such an extent as to have some bearing upon the air-tight contact of the outside surfaces of the stockings against the inside surfaces of the outside tubes.

Figure 4:
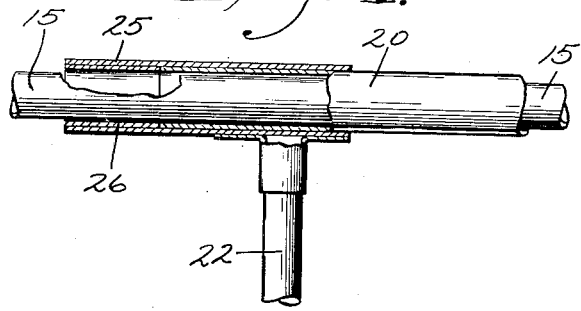
Fig. 4 is a detail of part of the structure shown in Fig. 1 with a portion of the outside tube and over-part broken away to exhibit my improved wear piece.

I therefore provide in my improved trombone a wear piece or sleeve made of a harder substance than the brass or other comparatively soft metal of which the sliding parts of the trombone are made, and I insert this sleeve within the over-part 25 forming a part of the supporting structure to which the cross bar 22 is connected. The over-part 25 is sleeve-like in its configuration, and since it extends beyond the outside tube in my improved construction, there is space and supporting structure provided for the reception of my wear piece 26, as shown most clearly in Fig. 4.

With this wear piece or insert 26 of hard metal in place, the wear at the lip of the outside tube is obviated, and since the wear upon the inside tube is distributed throughout substantially the entire length thereof, I am able to produce through the use of my new construction a trombone which will have an exceedingly long life, whereas in the past, trombones have, in the hands of professional users, had a comparatively short life.

Likewise, as referred to above, I have by provision of this wear piece 26 maintained a substantially invariable angular relationship of the inside tube to the outside tube, thus adding a great deal to the life of the stocking 23, which when properly lubricated as provided for in my new construction of a stocking, maintains a more perfect air-tight relationship to the outside tube.

I claim:

1. In a slide trombone a stocking for the inside tube, said stocking being provided with pockets for lubricant.

2. The combination with an inside tube of a slide trombone, of a stocking therefor, said stocking comprising a perforated sleeve tightly fitted upon the tube.

3. In a slide trombone having an inside tube provided with imperforate walls, a perforated stocking fixed to the tube adjacent the end thereof whereby to provide a stockinged inside tube provided with pockets for storage of lubricant.

FRANK HOLTON.